(Specimens.)

J. STUCKES, Jr.
CONFECTION CAPSULE.

No. 325,711. Patented Sept. 8, 1885.

Witnesses:
Chas. E. Gaylord.
L. M. Freeman.

Inventor:
John Stuckes, Jr.
By G. B. Coupland & Co
Att'ys—

United States Patent Office.

JOHN STUCKES, JR., OF CHICAGO, ILLINOIS.

CONFECTION CAPSULE.

SPECIFICATION forming part of Letters Patent No. 325,711, dated September 8, 1885.

Application filed April 8, 1885. (Specimens.)

*To all whom it may concern:*

Be it known that I, JOHN STUCKES, Jr., residing in Chicago, Illinois, have invented certain new and useful Improvements in a Confection Capsule, of which the following is a full, clear, and exact description, that will enable others to make and use the same, reference being had to the accompanying drawings, forming a part of this specification.

The object of this invention is the production of a new article of manufacture which consists of a candied capsule or receptacle adapted to be filled with various liquids, preparations, decoctions, or the juices of fruits, and then hermetically sealed, so as to preserve all the natural qualities and goodness of the contents until required for use.

The nature of this invention consists in the manufacture of a beverage confection or capsule of any desired form or size, the sugar forming the capsule and the contents inclosed being so proportioned that when broken in a glass and water added the same will form a drink without further ingredients.

Figure 1:
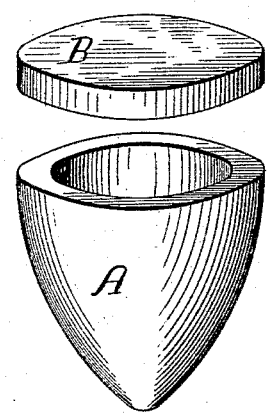
Figure 2:
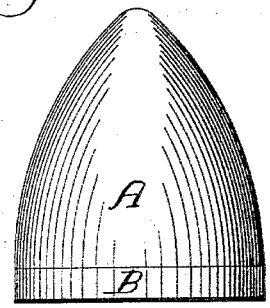
Figure 3:
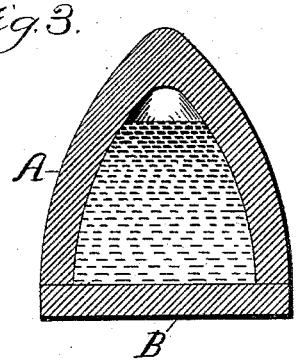

Figure 1 shows the capsule and cover apart; Fig. 2, the article as a whole, and Fig. 3 a vertical section.

Referring to the drawings, A represents a candy or sugar capsule of a conical form, and B the cover or cap adapted to close and hermetically seal the contents of said capsule.

The receptacle is illustrated in the form of a cone, for the reason that this shape was used in experimenting and perfecting the improvement; but the article may be molded in any desired form, as may be considered best in practical working.

In preparing this candied capsule the sugar is first subjected to the continuous action of heat for such a length of time as will cause the same to attain the required degree of crystallization when solidified in the molds, thus preventing the absorption of the liquid contents of which the capsule is made the receptacle. When the capsule is removed from the mold, it is charged with any desired liquid, cordial, or juice, in accordance with the nature of the beverage or drink it is intended to produce. The article is then hermetically closed or sealed, thus preventing evaporation, impairment, or change in the quality of the liquid contents.

This article is especially intended to be charged with the expressed juice of the lemon, so that in preparing a lemonade all that is necessary to be done is to drop the capsule into a glass, break the same, and add the desired quantity of water, the sugar forming the capsule and the contents thereof being so proportioned as to impart the right flavor to the drink when the sugar is dissolved by the action of the water. The capsule may also be charged with strong decoctions of coffee, tea, &c., and used in the preparation of hot beverages.

When desirable, the contents of the capsule may be in the form of a powder or dry composition.

Having thus described my invention, what I claim as new, and desire to secure by Letters Patent, is—

1. A candy capsule adapted to be charged or filled with a liquid suitable to form a beverage, and then hermetically sealed, substantially as set forth.

2. A candy capsule filled with a dry or liquid composition, hermetically sealed, and adapted to form a beverage when dissolved in water, substantially as described.

JOHN STUCKES, JR.

Witnesses:
L. M. FREEMAN,
J. B. DONALSON.